(12) United States Patent
McCarvill et al.

(10) Patent No.: US 7,032,279 B2
(45) Date of Patent: Apr. 25, 2006

(54) APPARATUS AND METHODS FOR REPAIRING COMPRESSOR AIRFOILS IN SITU

(75) Inventors: John McCarvill, Clifton Park, NY (US); Ronald H. Lawson, Jr., Ballston Lake, NY (US); Elena Rozier, Schenectady, NY (US); Michael Bousquet, Hewitt, NJ (US); Richard M. Hatley, Madison, NJ (US); Kenneth J. Hatley, Madison, NJ (US)

(73) Assignee: General Electric Company, Schenectady, NY (US)

( * ) Notice: Subject to any disclaimer, the term of this patent is extended or adjusted under 35 U.S.C. 154(b) by 177 days.

(21) Appl. No.: 10/273,345

(22) Filed: Oct. 18, 2002

(65) Prior Publication Data

US 2004/0074093 A1 Apr. 22, 2004

(51) Int. Cl.
*B21C 37/30* (2006.01)

(52) U.S. Cl. .................. 29/90.01; 29/402.19; 29/889.1; 29/889.7; 29/714; 29/709; 29/81.021

(58) Field of Classification Search ............. 29/402.19, 29/889.7, 889.72, 888.02, 888.021, 889.1, 29/705, 709, 714, 720, 721, 90.01, 81.02; 451/9, 296, 297, 299, 355, 3, 439, 441, 440
See application file for complete search history.

(56) References Cited

U.S. PATENT DOCUMENTS

| 2,846,828 | A | * | 8/1958 | Pilon .......................... 451/441 |
| 2,997,437 | A | * | 8/1961 | Whitaker .................... 204/209 |
| 3,528,200 | A | * | 9/1970 | Santiago et al. ............ 451/305 |
| 4,327,526 | A | * | 5/1982 | Pettyjohn et al. ........... 451/440 |
| 4,741,128 | A | * | 5/1988 | Reaves et al. .............. 451/439 |
| 4,934,109 | A | * | 6/1990 | Allred ......................... 451/51 |
| 5,197,191 | A | * | 3/1993 | Dunkman et al. ......... 29/889.1 |
| 5,271,255 | A | * | 12/1993 | Thompson ..................... 72/53 |
| 5,868,857 | A | * | 2/1999 | Moinpour et al. ............. 134/6 |
| 5,950,765 | A | * | 9/1999 | Pearson et al. ........... 185/40 R |
| 6,398,622 | B1 | * | 6/2002 | Chern et al. .................. 451/22 |
| 2001/0052159 | A1 | * | 12/2001 | Moinpour et al. ............ 15/102 |
| 2002/0184992 | A1 | * | 12/2002 | Brando ..................... 84/411 R |

* cited by examiner

*Primary Examiner*—Marc Jimenez
(74) *Attorney, Agent, or Firm*—Nixon & Vanderhye P.C.

(57) ABSTRACT

The apparatus includes a track mounted in the inlet of a compressor. A manipulator is mounted for movement about the track and carries three modules, the last of which mounts a tool head for movement in a Cartesian coordinate system and about the track. A measuring head measures the location of the airfoil surface. An abrading tool mounted on the third module removes surface material from the airfoil. Subsequently, a shot-peening device, either a flapper with embedded shot or free shot is impacted against the abraded surface to strengthen the surface. Final inspection is performed by a light and camera head mounted on the third module.

33 Claims, 16 Drawing Sheets

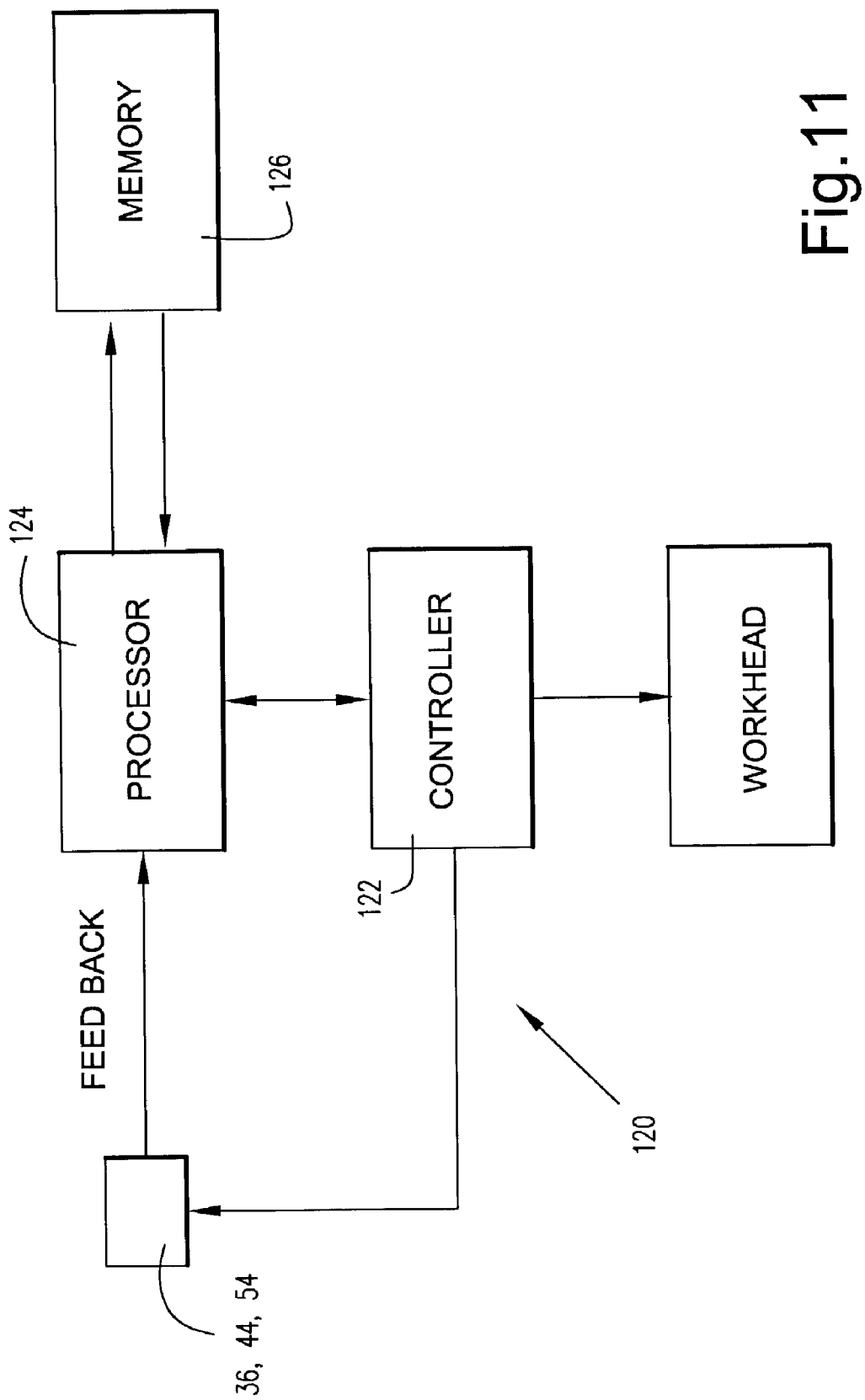

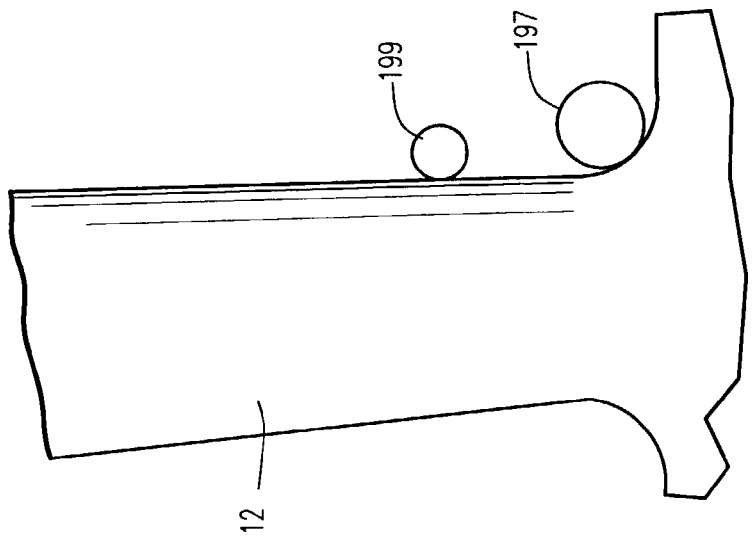
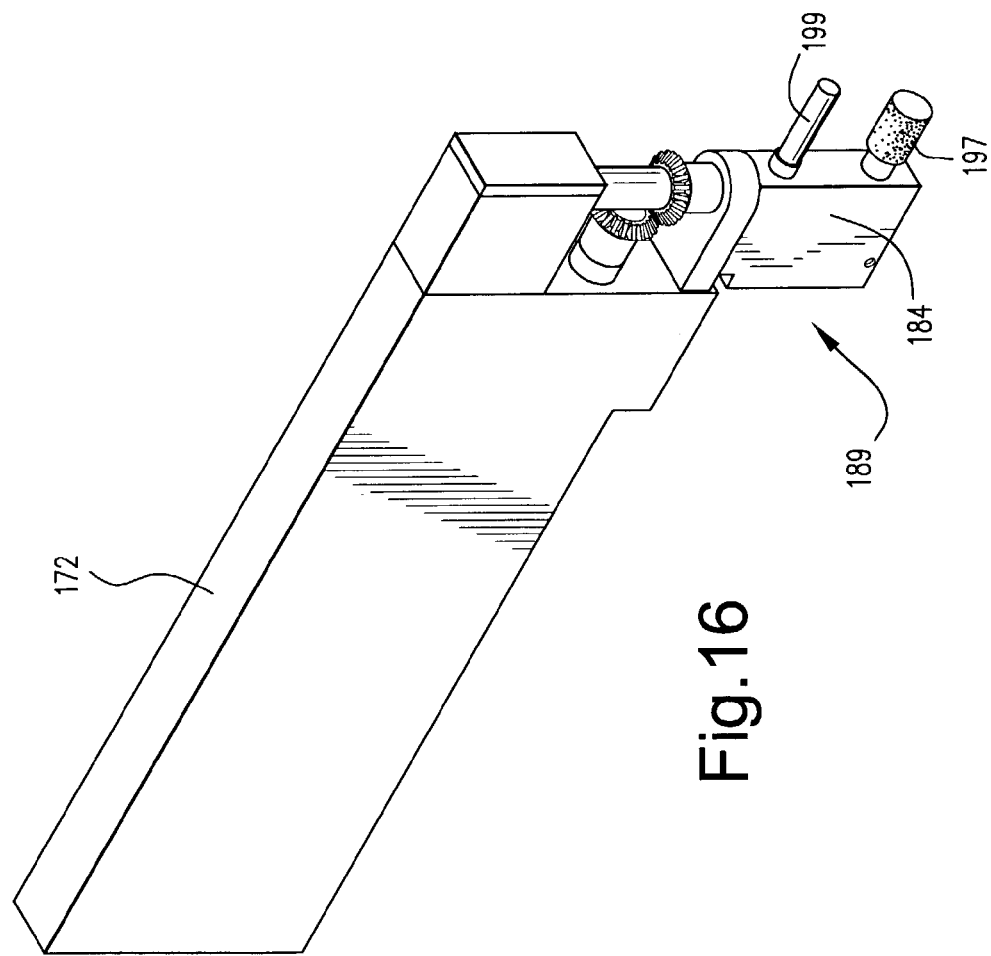

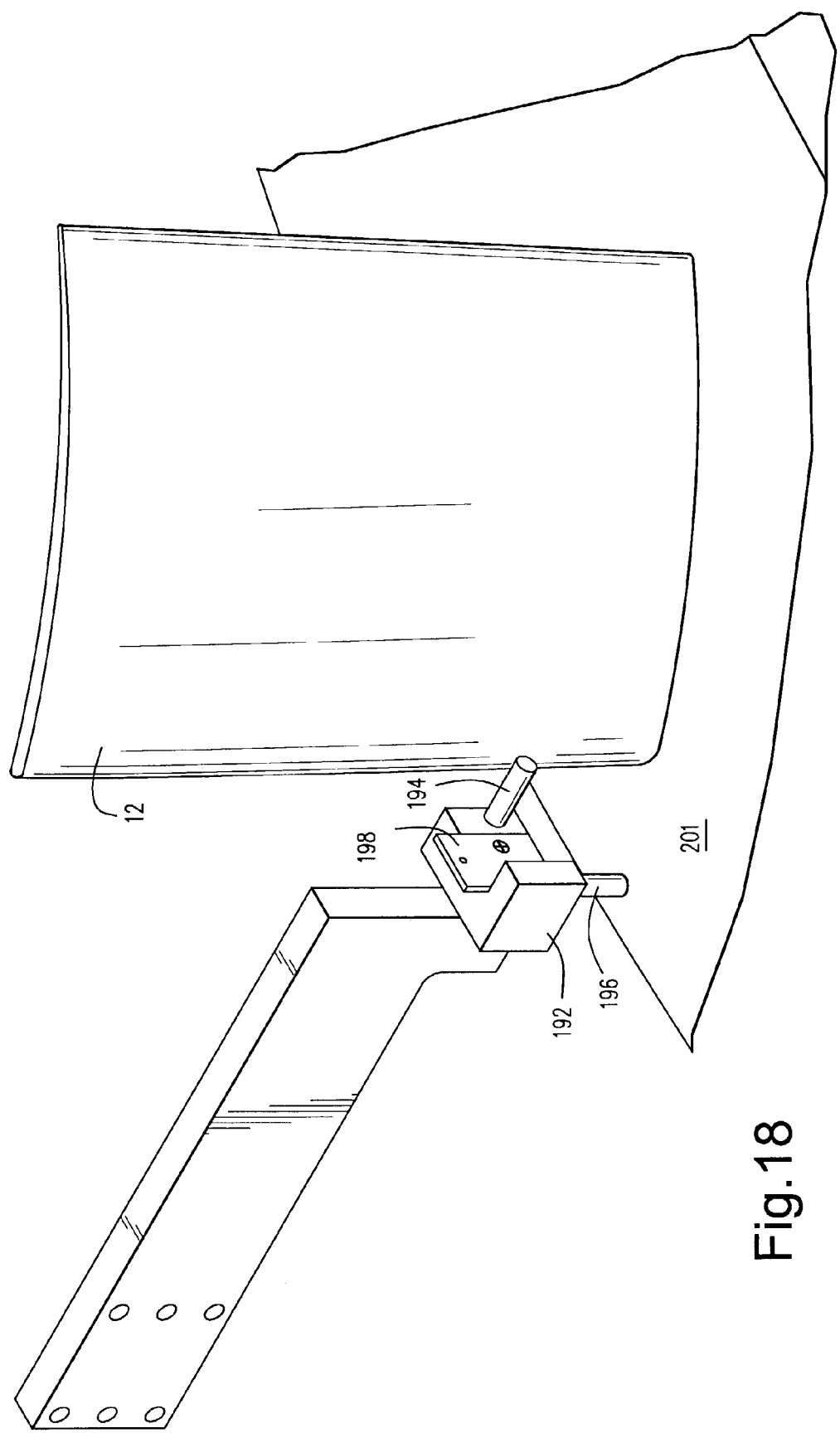

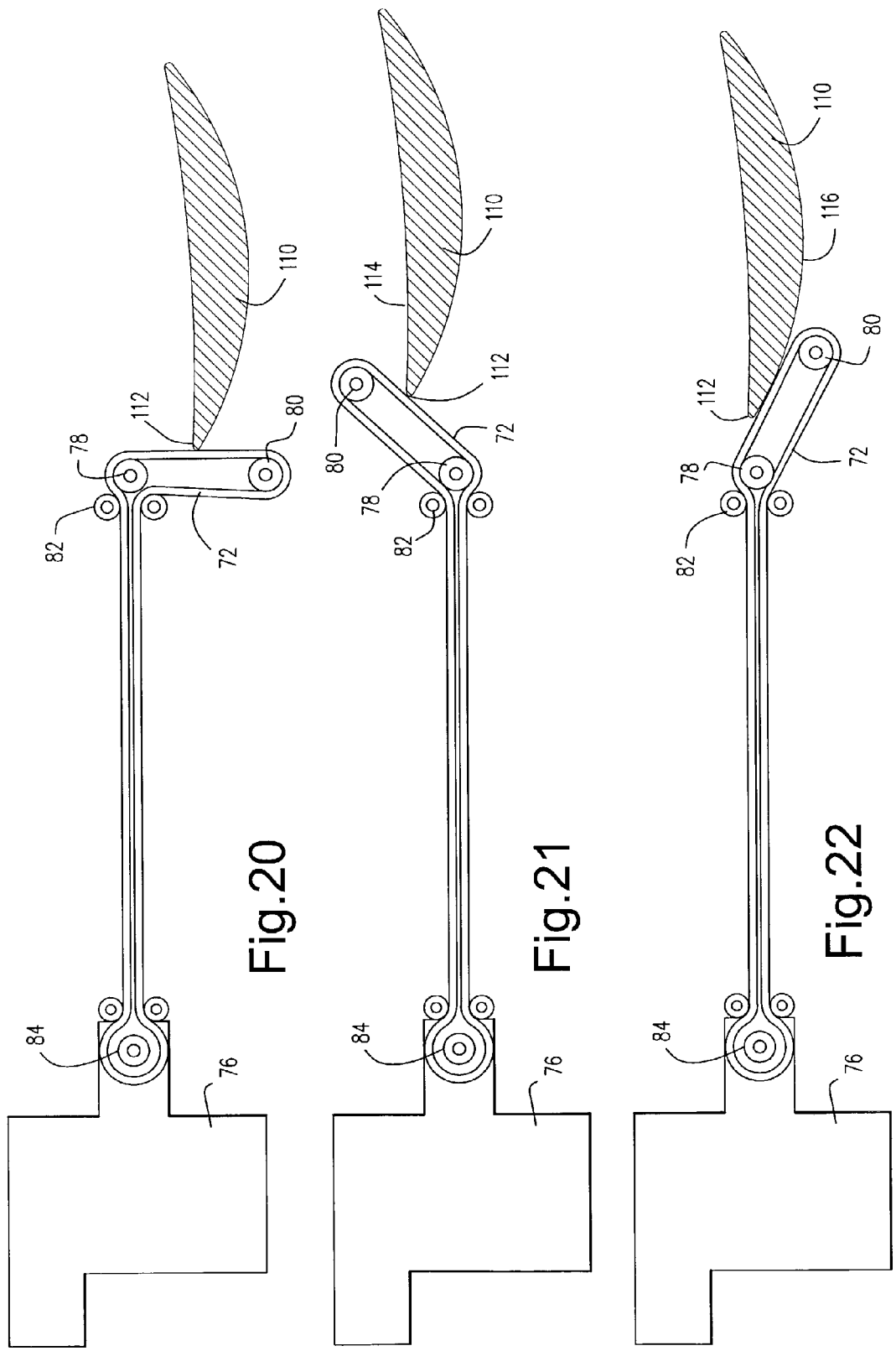

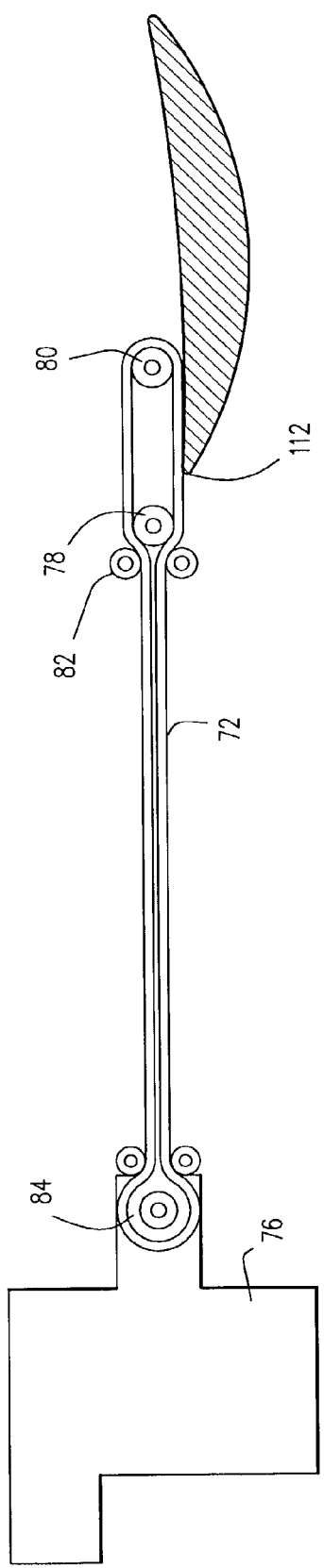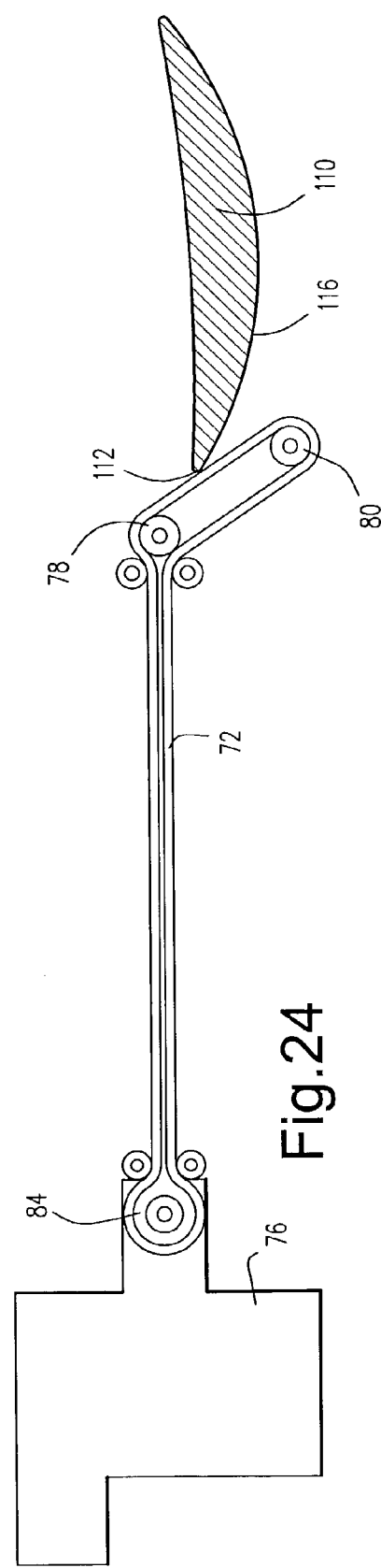

APPARATUS AND METHODS FOR REPAIRING COMPRESSOR AIRFOILS IN SITU

BACKGROUND OF THE INVENTION

The present invention relates to automated repair of damaged airfoils on turbines and particularly relates to a computer-controlled mechanical manipulator for measuring, inspecting and repairing airfoil blades in situ.

Machine components such as gas turbine airfoils can experience damage in use or during installation. For example, one type of damage, blade erosion, particularly occurs about the leading edge portions of the rotating blades. Manual repair methods that require the removal of compressor casings and enclosures are costly and time-consuming processes. While processes using hand-held tools, such as grinding and sanding tools, have been developed and utilized for the purpose of repairing airfoils, the quality of the manual repairs depends on the skill and attention of the craftsman performing the work. Process consistency is not assured in those repairs. In addition, substantial time and costs are necessary to disassemble and reassemble the turbine components. Accordingly, there is a need for automated repair of airfoils.

BRIEF DESCRIPTION OF THE INVENTION

In accordance with a preferred embodiment of the present invention, there is provided apparatus and methods for enabling automated repair of turbine airfoils in situ. Generally, the system enables the inspection and measurement of the airfoils prior to repair, a removal of the damaged surface of the airfoil, typically along the leading edge of the airfoil, and the restoration of the airfoil to a desired optimum strengthened surface configuration. Particularly, the system includes an arcuate track for mounting on the inner diameter of the inlet of the compressor and a manipulator for movement about the track in a generally circumferential direction. Interchangeable tools are attached to and carried by the manipulator for movement along three orthogonally related axes relative to the manipulator, i.e., generally tangent to the track, generally radially and along an axis parallel to the axis of rotation of the compressor, i.e., an in-and-out motion. As a consequence of this arrangement, the working part of the tool, or work head, can be located adjacent a selected airfoil. The tools may include, but are not limited to, a measuring tool, grinding or polishing tools, a flapper peening tool, as well as a camera for visually inspecting the airfoil surface.

More particularly, first, second and third modules, which are driven in the coordinate directions X, Y and Z by lead screws, are mounted to the manipulator. The lead screws are under servo-motor control so that the position of the work head is known at all times. The manipulator and the various modules are driven remotely from a control station through a controller, for example, using a joystick for manual operation or using motion control software enabling the work head to be moved in a specified repeatable manner with automated patterns. The motion control system provides continuous feedback of work head position. Stabilizing rams may be interconnected between the manipulator and the outer casing of the compressor inlet to lock the manipulator in a desired location to provide a stable platform for repairing selected airfoils.

In utilizing the apparatus hereof, the measuring tool is mounted on the third module and may comprise a linear variable differential transducer, electronic linear encoder, or similar device, to record the distance from the manipulator to a variable location such as the contour of the leading edge of the selected airfoil. By mapping and recording the location of the airfoil relative to the manipulator using the measuring tool, another work tool such as a grinding or abrasive tool may be mounted on the third module in lieu of the measuring tool and inserted through the compressor inlet past the non-rotating, or stationary inlet vanes to grind or abrade the surface to remove a predetermined magnitude of material from the selected airfoil. For example, the leading edge of the selected airfoil can be ground or abraded to remove a certain amount of material which has been eroded or otherwise damaged. The work head of the tool follows the desired contour of the selected airfoil portion, typically along the leading edge and opposite sides of the airfoil adjacent the leading edge which had been damaged. For example, a blending tool may comprise an abrasive belt mounted on the tool which has a fixed section and a section articulated to the fixed section. The abrasive belt spans between the two sections such that the articulated section can be located along opposite sides of the leading edge and along the leading edge at various angles to abrade the damaged material from the airfoil surface. The articulated section maintains the belt against the airfoil with a substantially constant force as the belt is displaced along the blade. Another type of tool is used to remove material in the fillet area, or root radius, of the airfoil. This tool also may comprise a fixed section and a section similarly articulated to the fixed section to provide a substantially constant force against the airfoil. A small, cylindrical, abrasive-coated work head may be mounted on the articulated section such that its orientation is essentially in line with the filleted area of the airfoil. This fillet area tool would also be mounted on the third module with a guide to preclude removal of material from the blade beyond a predetermined magnitude.

The repaired surface is then inspected, for example, by mounting a camera on the third module carried by the manipulator, or using a hand-held camera and inserting the camera into the first stage of the compressor to view the repaired surface. If the surface is properly repaired, it is then strengthened by shot peening. To accomplish this, the abrasion tool or fillet area tool is removed from the third module and replaced with a tool which is provided with a flapper for captive shot peening. Alternatively, the fillet area tool may be configured such that the cylindrical abrasive work head may be removed and replaced with a flapper peening work head. The flapper per se is commercially available and comprises a plurality of steel shot embedded or secured in a rectangular piece of flexible material such as a woven cloth-type material. The flapper work head is mounted in the flapper peening tool for rotation about a central axis whereby the steel shot carried by the flapper periodically impacts the airfoil surface as the flapper is rotated. The impact of the steel shot against the airfoil surface provides residual compressive stresses in the surface and strengthens the surface. With the known measurements of the airfoil section previously recorded, the shot peening flapper may be positioned to maximize the impact of the steel shot against the surface and to follow the repaired surface such that selected areas of the surface are strengthened.

As an alternative to the flapper employing steel shot, free shot peening may be provided. To accomplish this, a shot peening gun having a nozzle is carried by the third module and located adjacent the repaired airfoil section. An enclosure is provided about the nozzle and about a part of the airfoil section to collect the free shot impacted against the airfoil surface by the shot peening gun. A vacuum system is applied to the enclosure about the airfoil and nozzle so that the spent steel shot is removed from the chamber. The movement of a nozzle along the repaired airfoil section is under the control of the processor based on the previously recorded measurements.

In a preferred embodiment according to the present invention, there is provided apparatus for in situ repair of airfoils of a compressor, comprising a manipulator for mounting to an inlet of the compressor and for movement in a generally circumferential direction about an axis, a tool carried by the manipulator for movement relative thereto and into the inlet of the compressor to a position in contact with a selected airfoil, a drive system for driving the tool into contact with the selected airfoil and a system for controlling the drive system to position the tool in contact with the selected airfoil for repairing the selected airfoil.

In a further preferred embodiment according to the present invention, there is provided apparatus for in situ repair of airfoils of a compressor, comprising an arcuate track for mounting to an inlet of the compressor, a manipulator mounted on the track for movement in a generally circumferential direction about an axis, a support system for a tool including a first module carried by the manipulator for movement relative thereto in a generally tangential direction, a second module carried by the first module for movement relative to the first module in a direction normal to the tangential direction and generally in a plane normal to an axis of the compressor, a third module carried by the second module for movement relative to the second module in a direction generally parallel to the axis, the tool being carried by the third module for movement therewith, a drive system for driving the modules in the respective directions, a system for measuring and recording the position of the tool relative to a selected airfoil and a system responsive to the measuring and recording system for controlling the drive system to position the tool relative to the selected airfoil for repairing the selected airfoil.

In a further preferred embodiment according to the present invention, there is provided a method for repairing a surface of a selected airfoil of a compressor in situ, comprising the steps of (a) mounting a manipulator adjacent an inlet of the compressor, (b) moving a tool carried by the manipulator into the compressor past a circumferential array of fixed vanes into proximity with a selected airfoil mounted on a rotor of the compressor, (c) displacing the tool in three dimensions for following a contour of a portion of the selected airfoil, (d) while following the contour of the selected airfoil portion, removing material from the selected airfoil portion by applying the tool thereto and (e) subsequent to step (d), strengthening the surface of the selected airfoil portion.

In a further preferred embodiment according to the present invention, there is provided a method for repairing a surface portion of a selected airfoil of a turbine, comprising the step of shot peening the airfoil section in situ.

BRIEF DESCRIPTION OF THE DRAWINGS

FIG. 11 is a schematic illustration of a motion control system for the repair apparatus hereof;

FIG. 16 is a view of a combination of an abrading/grinding and guide tool for blending the fillet area of the blade and root;

FIG. 17 is a schematic illustration of the fillet and guide tool in position adjacent a leading edge of the blade;

FIG. 18 is a perspective view of a measuring tool mounted on the third module;

FIGS. 20–24 are schematic illustrations of the work head of the abrasive tool of FIG. 4 in various positions for repairing leading edge portions of the leading edge of a compressor airfoil.

DETAILED DESCRIPTION OF THE INVENTION

Figure 1:
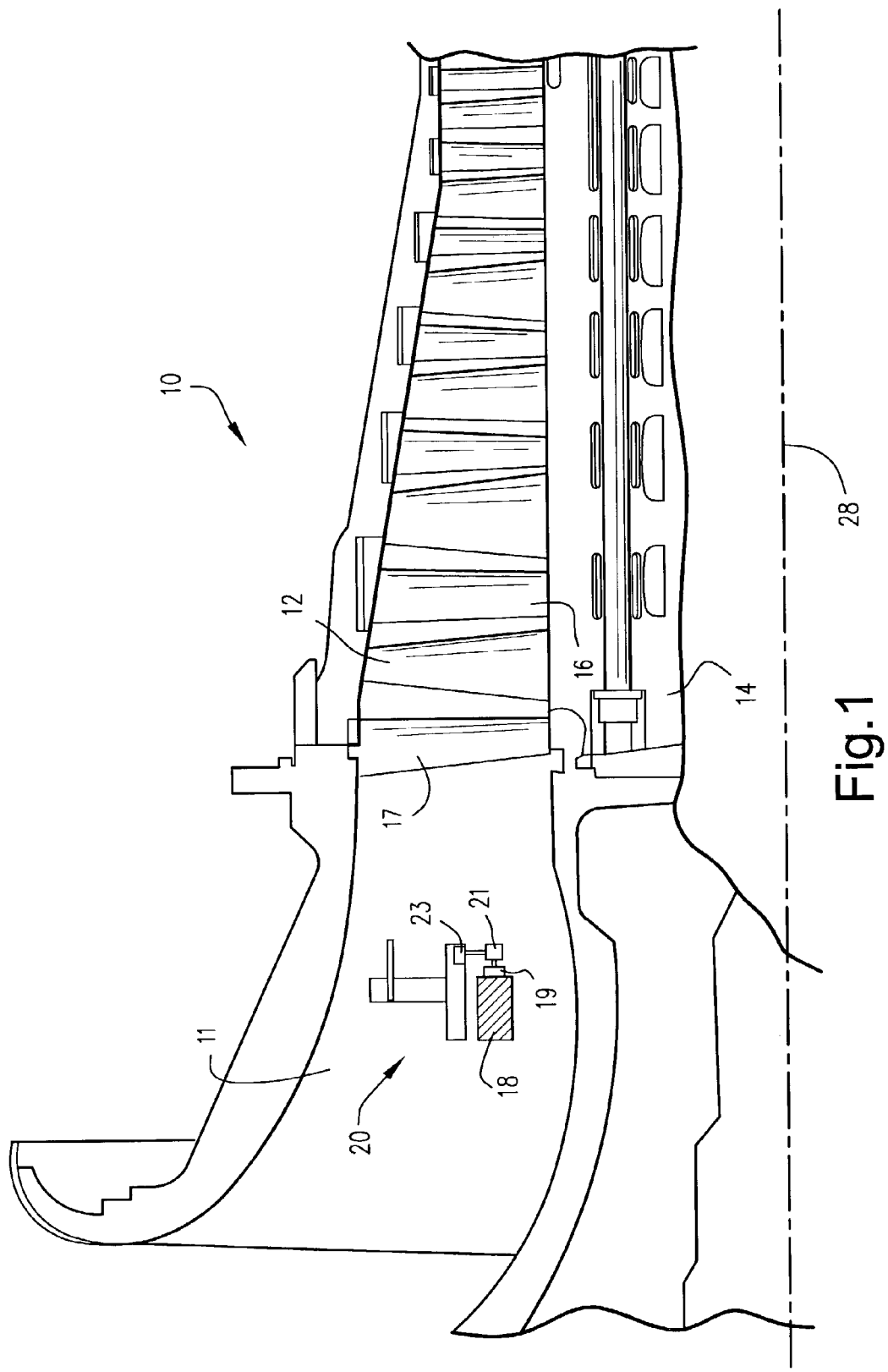
FIG. 1 is a fragmentary side cross-sectional view of a compressor including the inlet portion illustrating apparatus for repairing compressor blades in accordance with a preferred embodiment of the present invention.

Referring now to the drawings, particularly to FIG. 1, there is illustrated in a fragmentary cross-sectional view a compressor, generally designated 10, including an inlet portion 11. Compressor airfoils 12 are mounted on a rotor 14 with intervening stator vanes 16, the rotor being rotatable about axis 28. As illustrated, an annular track 18 is mounted in the inlet portion 11 of the compressor 10, e.g., clamped to the inlet cone or inner diameter, just upstream of the stationary inlet vanes 17. A manipulator, generally indicated 20, is mounted on the track for movement circumferentially about the track. The track 18 has gear teeth 19 for engaging corresponding gear teeth 21 driven by a servo-motor 23 carried by the manipulator 20. Thus, by driving the gear 21 on the manipulator 20, the manipulator 20 may be driven to any rotational position about the inlet of the compressor and the track. By employing a servo-motor under computer control, the circumferential position of the manipulator about the compressor inlet is known at all times.

Figure 2:
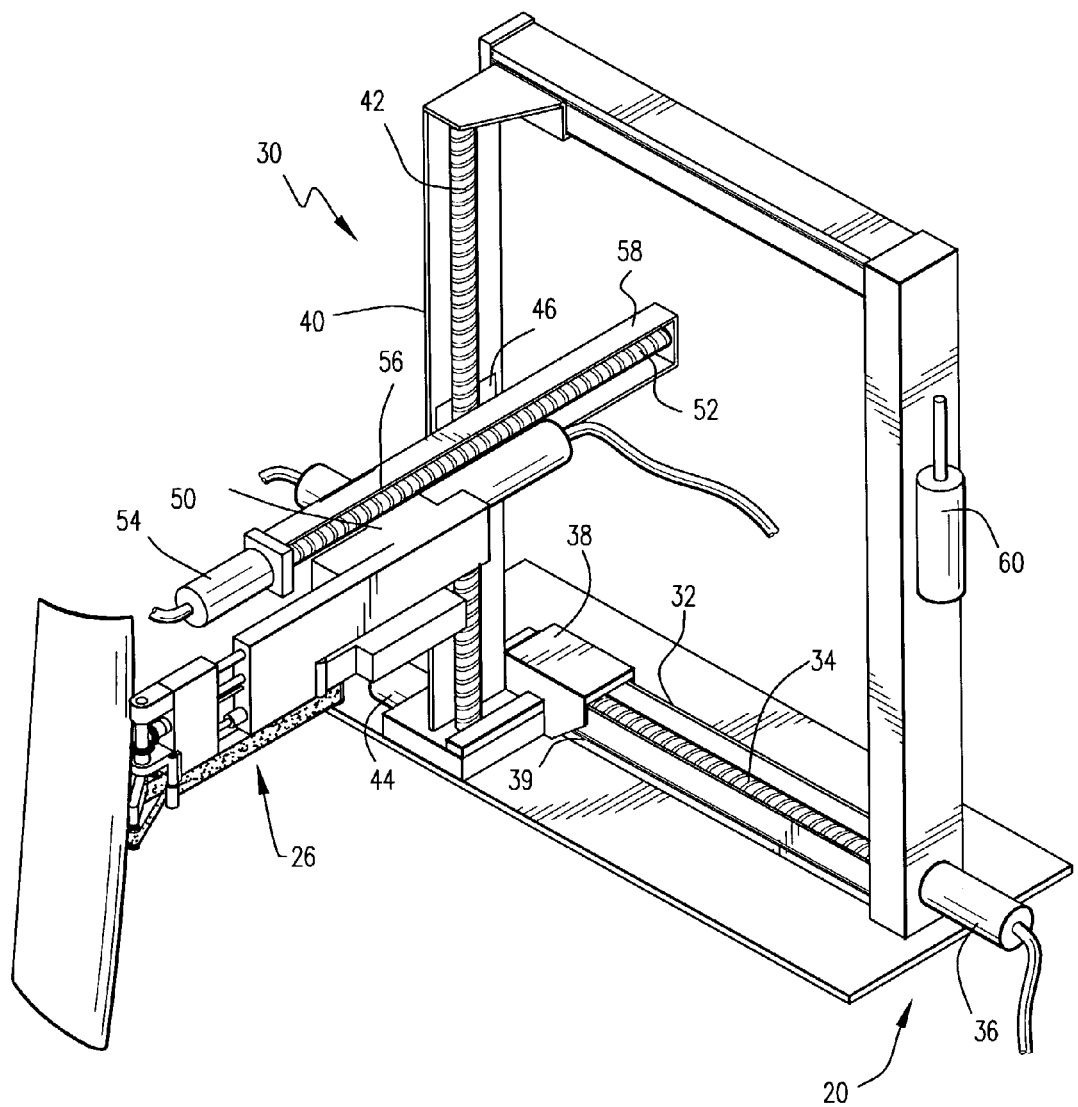
FIG. 2 is a schematic perspective view of a tool head mounted to the manipulator and forming part of the airfoil repair apparatus.
Figure 3:
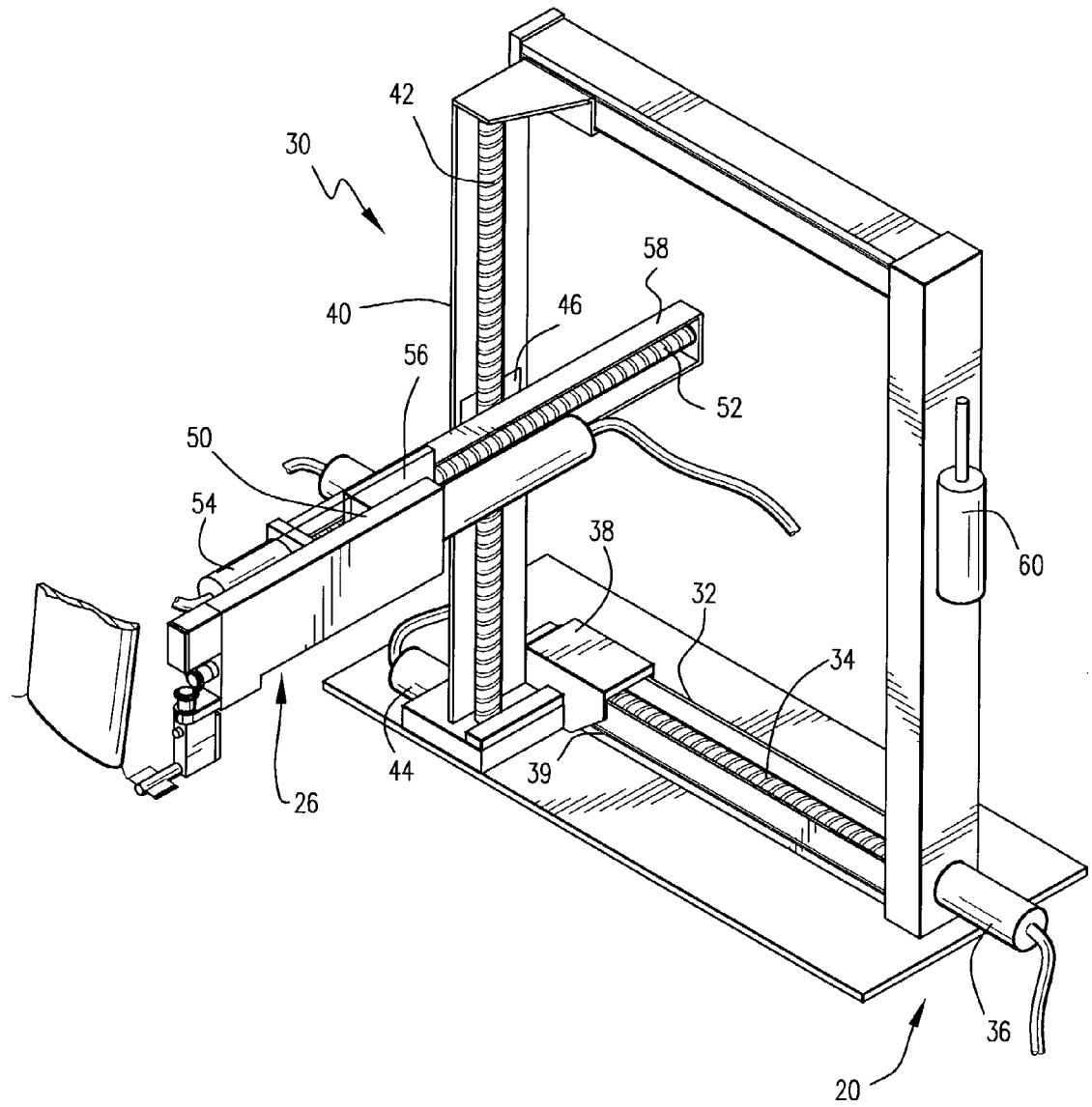
FIG. 3 is a view similar to FIG. 2 illustrating a further form of tool head forming part of the repair apparatus.

As best illustrated in FIGS. 2 and 3, the manipulator 20 carries a support system for a tool, generally designated 26, for example, a measuring tool, an abrasion/grinding or sanding tool or a peening tool. The support system includes a first module 32 carried by the manipulator 20 for displacing tool 26 for movement relative to the manipulator 20 in a generally tangential direction relative to the rotational axis 28 of the compressor. The first module 32 includes a lead screw 34 carried by the manipulator 20 under the control of a servo-motor 36. The lead screw follower 38 mounted on a track 39 is thus movable in a generally tangential direction along track 39 under the control of lead screw 34 and servo-motor 36. The first module 32 carries a second module 40 for movement relative to the first module in a direction normal to the tangential direction and generally in a plane normal to the rotor axis 28. Second module 40 includes a lead screw 42 driven in rotation by a servo-motor 44 under computer control. A lead screw follower 46 is coupled to the lead screw 42 so that the follower 46 is movable in a direction at right angles to the direction of movement of the follower 38 of the first module. A third module 50 is carried by the second module 40 for movement relative to the second module in a direction generally parallel to the axis of the compressor. The third module includes a lead screw 52 driven by a servo-motor 54. A lead screw follower 56 is mounted on the arm 58 for movement under control of the servo-motor 54 and lead screw 52. The lead screw follower 56 mounts the tool 26 as illustrated.

With the foregoing arrangement, it will be appreciated that any tool 26 carried by the third module is capable of movement in X, Y and Z Cartesian coordinates relative to the manipulator 20. Those movements correspond to a generally tangential direction, a direction normal to the tangential direction and in a plane normal to the axis of the compressor and a direction generally parallel to the axis of the compressor, i.e., in-and-out relative to the rotational axis 28 (FIG. 1) of the compressor. As illustrated in FIG. 2, rams 60 may be mounted on opposite sides of the manipulator 20 to engage the inner shell of the inlet portion 11 to the compressor to stabilize the manipulator during operation.

Figure 4:
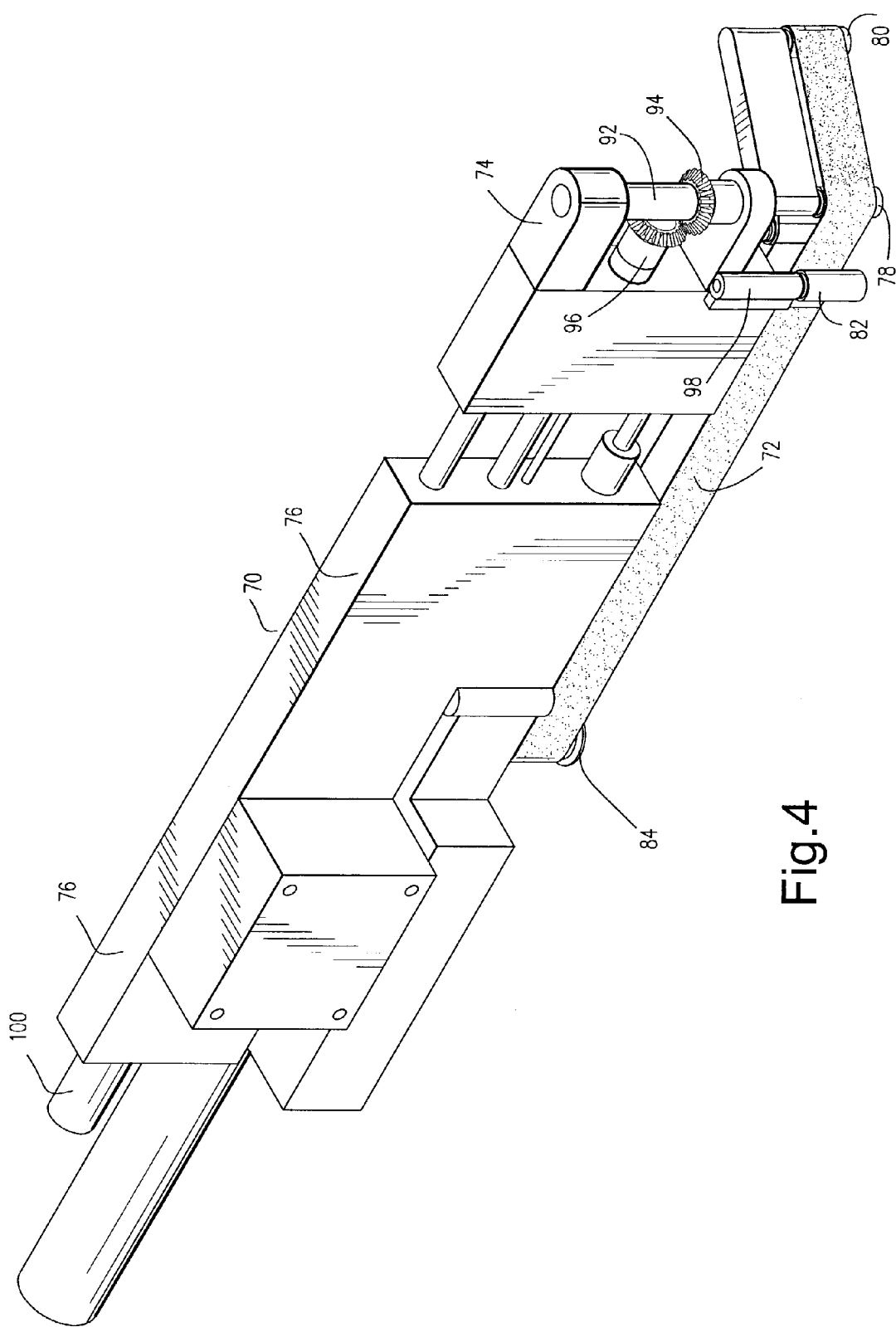
FIG. 4 is a perspective view of a tool head used for abrasively repairing the compressor airfoils.
Figure 5:
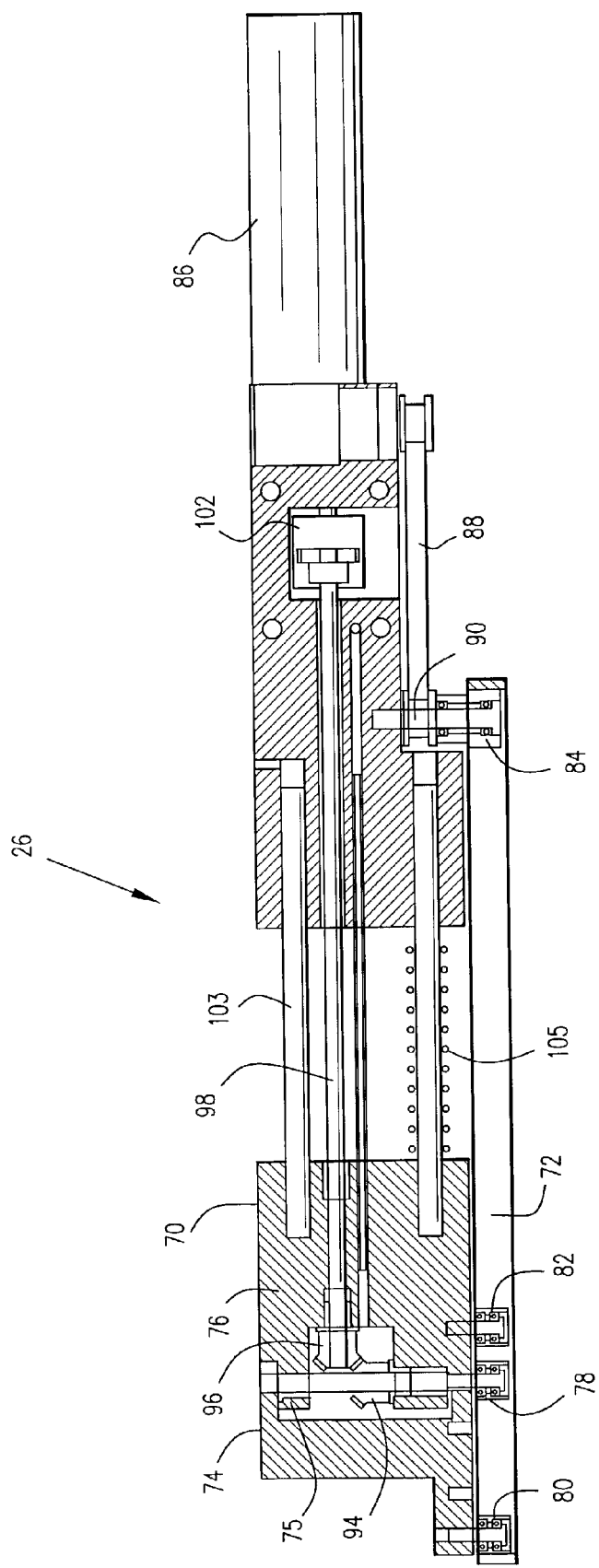
FIG. 5 is a cross-sectional view of the tool head of FIG. 4.

Referring to FIGS. 4 and 5, the tool 26 may comprise a blending tool 70. Blending tool 70 is releasably mounted to the third module 50 by suitable mounts. For example, the blending tool may be bolted to the third module 50 so that the blending tool is fixed in position and movable along the four axes by the various servo-motors driving the manipulator 20 circumferentially and the modules 32, 40 and 50 in their respective directions. The blending tool 70 may comprise any suitable tool for repairing the airfoil blades and particularly their leading edges. In a preferred embodiment hereof, the blending tool 70 comprises, for example, an endless abrasive belt 72 for abrasively contacting the surfaces of the compressor airfoils. The belt 72 is mounted about a finger or articulated section 74 pivoted to an end of the tool housing or fixed section 76. Particularly, the belt 72 is mounted on a pair of idler wheels 78, 80 along an edge of the articulated finger. The belt 72 continues between and is straddled by a pair of idler wheels 82 mounted at the tip of the tool housing 76 and extends about a drive wheel 84. Housing 76 also carries a pneumatic motor 86 which drives a timing belt 88 (FIG. 5) which, in turn, drives a spindle 90 mounting the drive wheel 84. By driving the spindle 90 from the air motor via the timing belt 88, the abrasive belt 72 is driven endlessly about the idler wheels 78, 80 and 82 and drive wheel 84.

To articulate the finger 74, the inner end of the finger 74 includes a shaft 92 fixed to the finger 74 and carried by hinges 75 on finger 74. A bevel gear 94 is carried by the shaft 92 and engages another bevel gear 96 mounted at the end of an elongated shaft 98 (FIG. 5). Shaft 98 is rotated by a gear motor 100 and through an articulated gear train 102 described below. The housing 76 may be provided in discrete segments connected one to the other by rods 103 with a belt tensioning spring 105 disposed between the housing sections to maintain tension on the abrasive belt.

Figure 6:
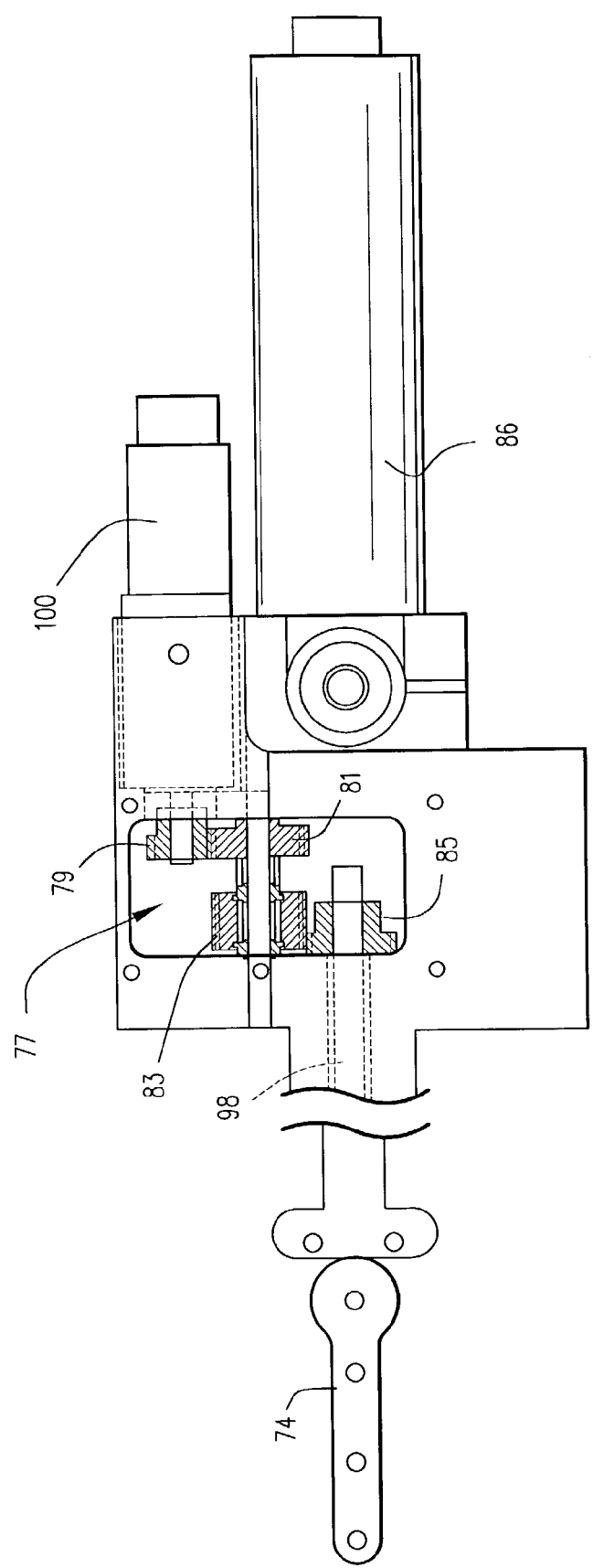
FIG. 6 is a top plan view of the tool head of FIG. 4 with parts broken out illustrating in cross-section a mechanism for maintaining a substantially constant force on the airfoils by the articulated finger of the tool head.

By the foregoing arrangement, the abrasive belt portion extending about the tip of the articulated finger 74 may be deflected, e.g., displaced laterally about shaft 92, for example, as illustrated in FIGS. 20–24, by deflecting finger 74. Finger 74 is deflected by operating motor 100 and driving gears 79, 81, 83 and 85 (FIG. 6), the latter gear being mounted on shaft 98 for pivoting finger 74 about the axis of shaft 92. In drawing FIGS. 20–24, a compressor airfoil 110 is illustrated and the abrasive belt 72 is engaged against leading edge portions 112 of the airfoil 110. In FIG. 20, the articulated finger 74 is substantially at right angles to the leading edge 112 of the airfoil and the abrasive belt bears against the leading edge to blend the edge. In FIG. 21, the articulated finger 74 has been shifted laterally to the opposite side, i.e., the pressure side 114 of the leading edge 112, for repairing the leading edge along the pressure side. In FIG. 22, the abrasive belt 72 has been manipulated to extend along the suction side 116 of the airfoil adjacent the leading edge 112. In FIG. 23, the abrasive belt 72 extends along the pressure side 114 of the airfoil 110 and FIG. 24 illustrates the abrasive belt 72 blending the leading edge 112 along the suction side 116.

Figure 8:
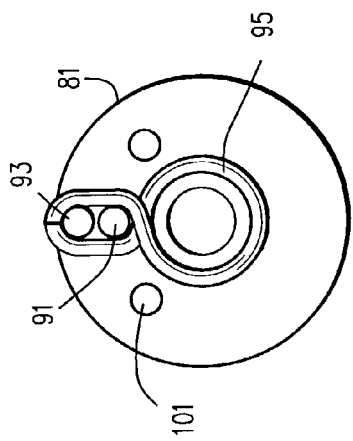
FIGS. 8, 9 and 10 are illustrations of cooperating parts of the mechanism of FIG. 7 affording the substantially constant force applied by the finger to the blade.
Figure 10:
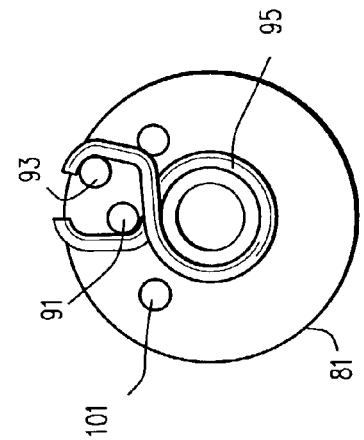
Figure 9:
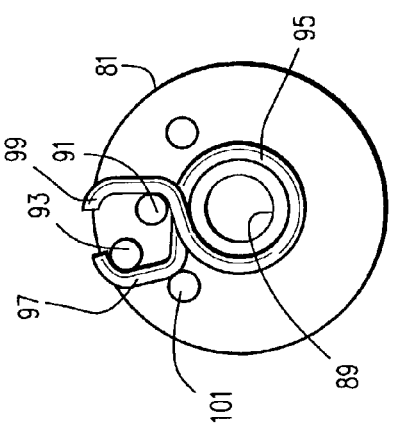
Figure 7:
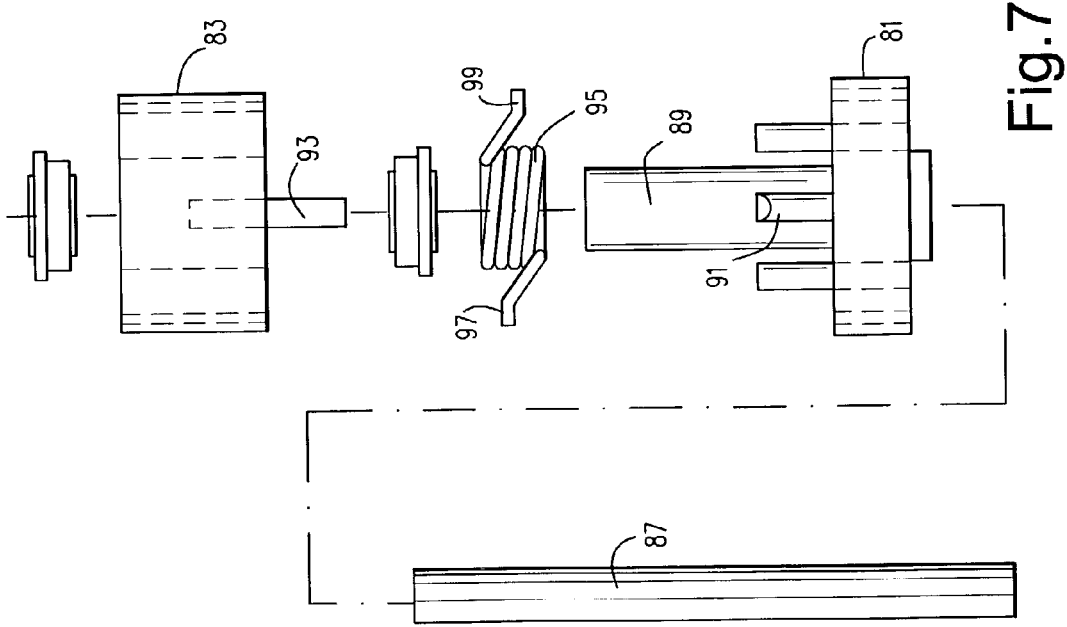
FIG. 7 is an exploded side elevational view of various parts forming the mechanism of FIG. 6.

Referring now to FIGS. 6–10, the articulated drive train 102 for deflecting finger 74 to one side or the other includes a mechanism, generally designated 77, comprising gears 79 and 83, which permits the finger 74 to be driven by motor 100 into a predetermined deflected position and then enables the finger 74 to be deflected out of the predetermined position against a bias whereby the finger is biased into engagement with the airfoil under a substantially constant force. The mechanism 77, as illustrated in FIG. 7, includes the gears 79 and 83 rotatable about a shaft 87 received within an axle 89 of gear 81. Gear 81 mounts a pin 91 and gear 83 mounts a pin 93 radially offset from the pin 91. About the axle 89 is a coil spring 95 having opposite ends 97 and 99 which engage respective opposite sides of pins 91 and 93. Spring 95 is preloaded such that ends 97 and 99 bear against the pins 91, 93 along opposite sides, e.g., as illustrated in FIG. 8. Stop pins 101 are also located on opposite sides of pin 91 on gear 81.

To deflect the finger 74, motor 100 is actuated and drives the finger about shaft 92 through gears 79, 81, spring 95, gear 83 and gear 85. When the finger 74 is motor-driven into the predetermined position, the finger may engage the airfoil with a compliant bias caused by the interaction of the spring 95 and pins 91 and 93 to deflect finger 74 from the predetermined position into a position providing a substantially constant force on finger 74 and, hence, the abrasive belt on the airfoil. Thus, by driving the finger using the motor to a predetermined position, the finger will deflect against the spring bias once the finger engages the airfoil, rotating gears 81 and 83 relative to one another and displacing pins 91 and 93 relative to one another. This action winds the spring 95 and imparts a bias to the finger 74, maintaining it in engagement with the airfoil under a substantially constant force.

A motion control system is provided for controlling the various motors for driving the manipulator 20 and the tool 26, as well as providing a continuous feedback of tool position. As illustrated in FIG. 11, the motion control system, generally designated 120, includes a controller 122 and a processor 124. The controller 122 may contain automated programs that move the components of the system, including the tool, in specified repeatable patterns. Also, the controller 122 may also include a device, such as a joystick-type device, which is used to remotely manually control the motors. By employing servo-motors 36, 44, 54, the positions of the various components are fed back to the processor and thus the position of the tool head 26 is known at all times. Additionally, when the tool 26 comprises a measuring head and the outline of the blade to be repaired is to be measured, a feedback system records the position of the measuring head and hence the position of the airfoil, e.g., its leading edge 112, in a memory 126. The measuring tool head, described below, may comprise a linear encoder having a high resolution, e.g., 0.004 inches. Thus, the tool, for example, the abrasion tool previously described, can be moved along a predetermined path using the measured distances as baselines for controlling the tool for movement along predetermined path, e.g., along the leading edge 112 as illustrated in FIGS. 20–24.

Figure 12:
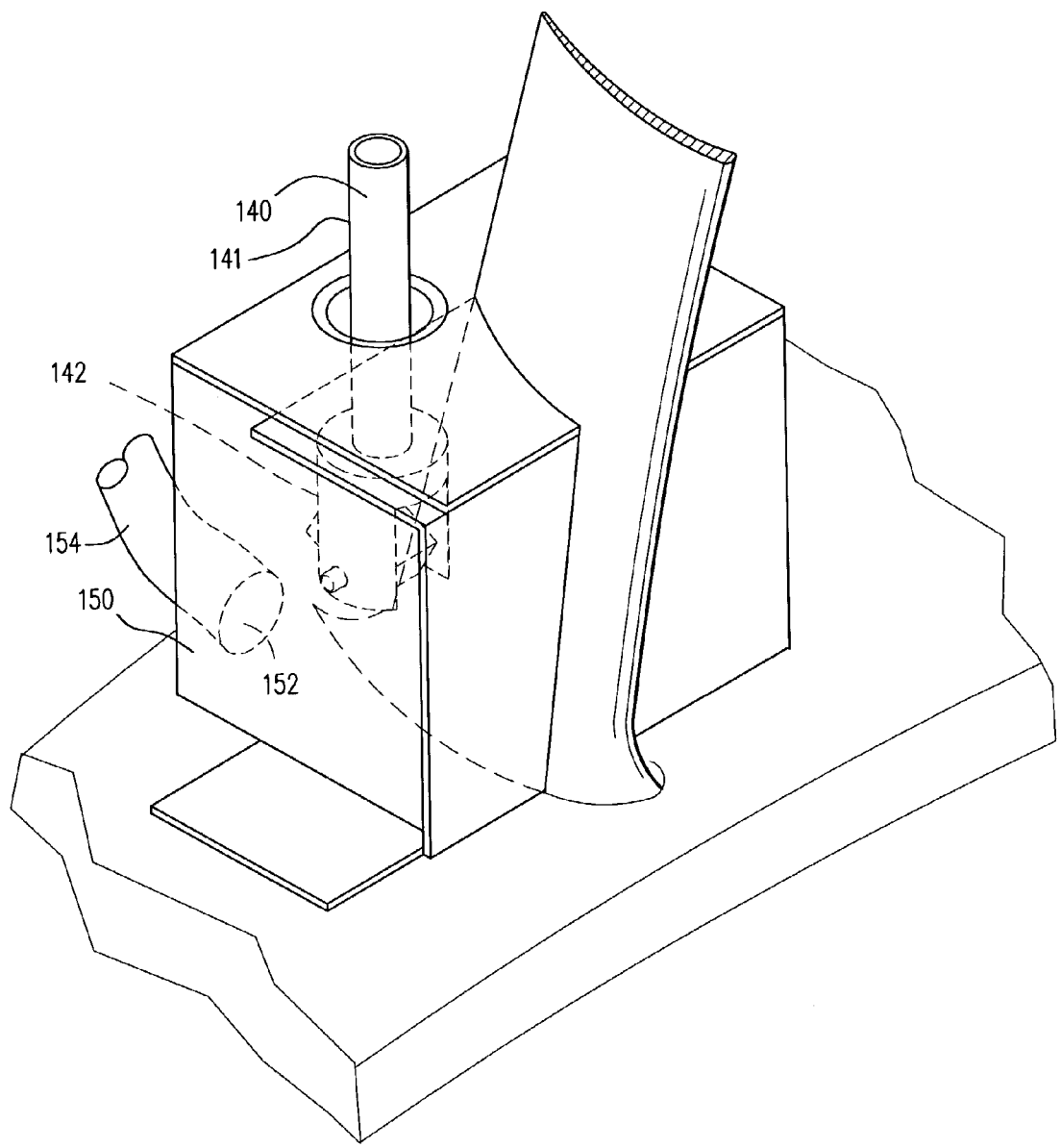
FIG. 12 is a schematic illustration of a device for strengthening the surface of the airfoil using free shot peening.
Figure 13:
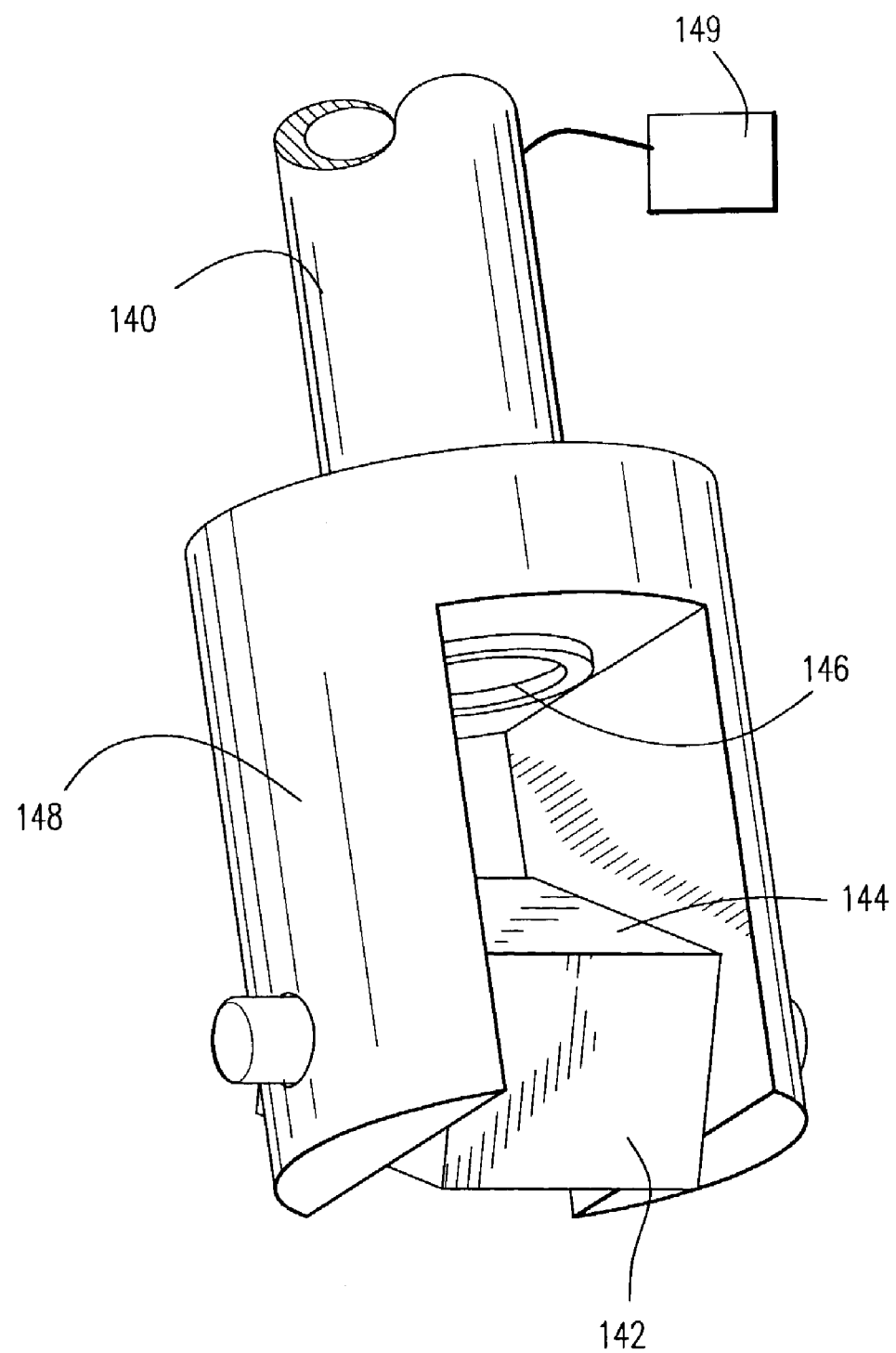
FIG. 13 is a perspective view of a deflector for use in free shot peening the airfoil surface.

Another tool employed in the process of repairing the airfoils, particularly the leading edges thereof, includes a peening head. Once the blending tool 26 has removed a certain magnitude of material from the airfoil, e.g., along the leading edge and on opposite suction and pressure sides adjacent the leading edge, and measurements are optionally made using the measuring head, described below, to ensure that the required material has been removed, a peening operation is performed along the surface from which material has been removed to strengthen the surface of the airfoil by placing residual compressive stresses in the surface. Referring now to FIG. 12, there is illustrated a free shot peening head 140 comprised of a gun barrel or tube 141 through which shot, i.e., small steel balls, are passed under pressure. The tube 141 may be coupled to a commercially available mobile abrasive blaster, not shown, for supplying steel shot under pressure within tube 141. At the tip of the peening tube 141 is a deflector 142 (FIG. 13). The deflector 142 has a flat surface 144 as illustrated in FIG. 12 in opposition to the nozzle 146 at the end of the shot peening tube 141. The deflector 142 is pivotally mounted on the nozzle head 148 such that the angle of the surface 144 relative to the nozzle 146 can be adjusted. Additionally, the tube 141 is rotatably adjustable about its long axis under control of a servo-motor 149. Thus, it will be appreciated that shot passing under pressure through tube 141 and through nozzle 146 impacts against surface 144 and is directionally controlled for impacting against the surfaces of the airfoil to be strengthened.

To retain the free shot and preclude the shot from introduction into the compressor, a peening shot retention enclosure 150 (FIG. 12) is disposed about the nozzle 146 and in part about the compressor airfoil. A vacuum system including a suction port 152 communicates with the interior of the enclosure 150 and, via a hose 154 to a vacuum pressure source, suctions the interior of enclosure 150 to remove shot from the enclosure. It will be appreciated that the enclosure may be formed of a compliant material, for example, a high Durometer rubber material with structural ribs for reinforcement. The retention enclosure thus captures the free shot and enables the shot to be removed from the enclosure after impact against the airfoil surface. The enclosure may take various forms depending upon the shape and extent of the compressor airfoil. For example, a compliant boot which may be solid or inflatable may be applied about the blade with the nozzle and suction port within the boot.

Figure 14:
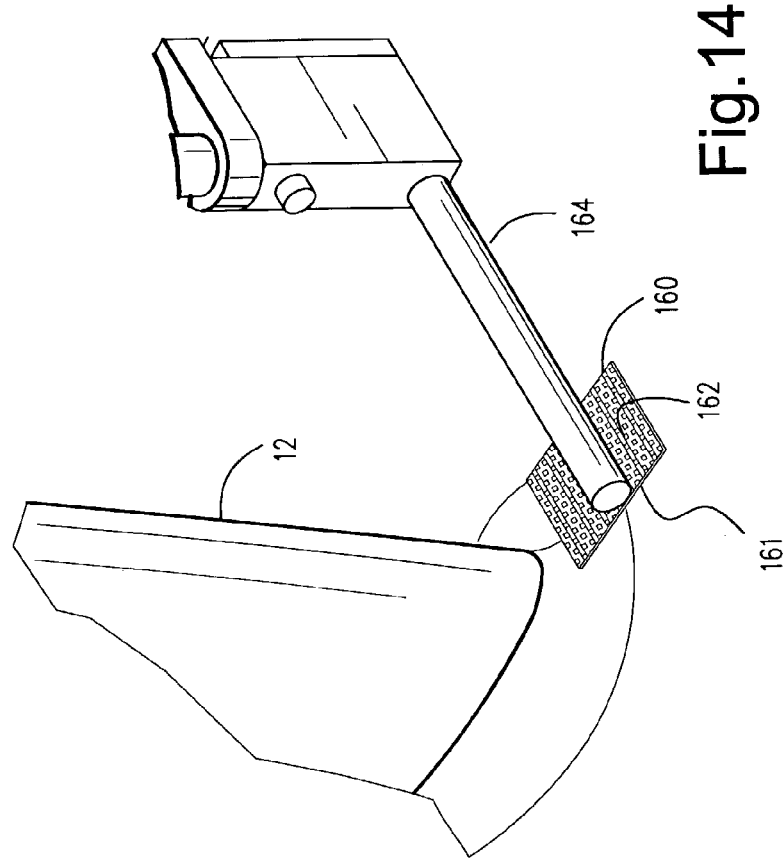
FIG. 14 is a fragmentary perspective view of flapper peening tool for peening the airfoil surface.
Figure 15:
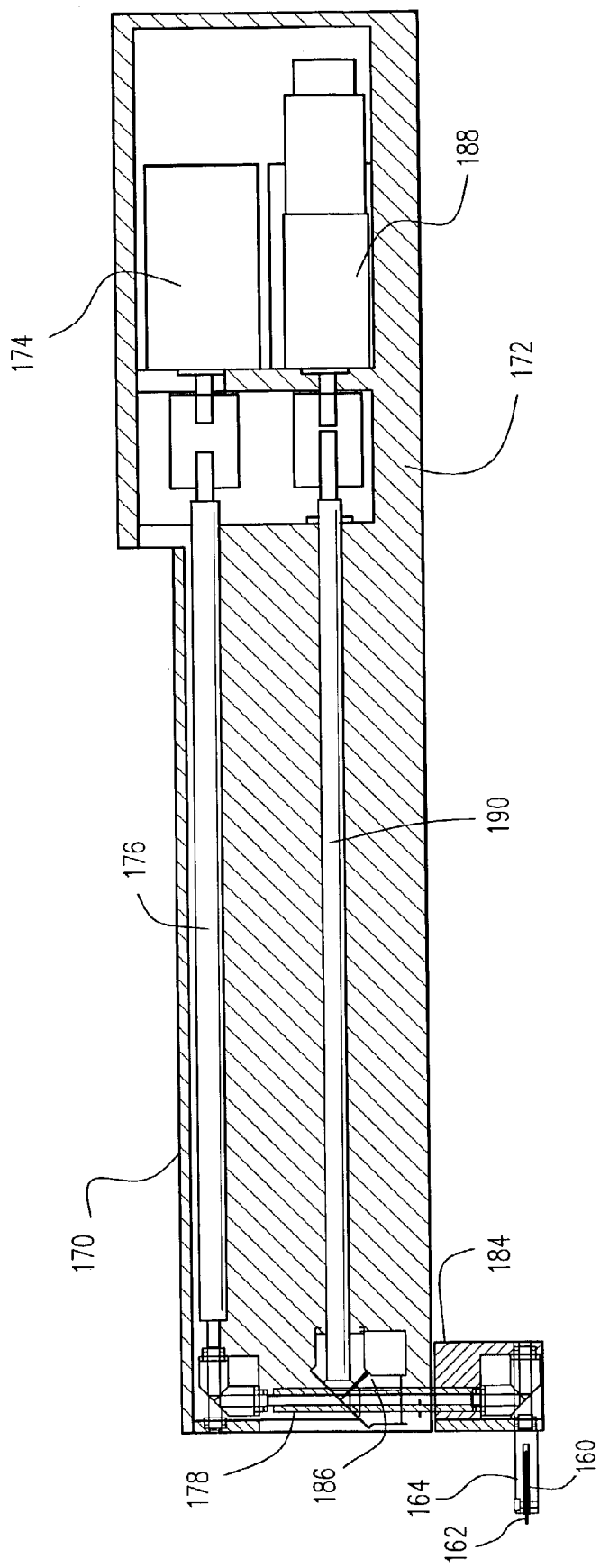
FIG. 15 is a cross-sectional view of the flapper peening tool.

Another peening tool may comprise a flapper 160. As illustrated in FIG. 14, a flapper includes a plurality of steel shot, i.e., balls, embedded in or otherwise secured to a flexible material, e.g., a woven matrix 161. The flapper 160 containing the captive steel shot 162 is mounted on the end of a rotary shaft 164. By rotating the shaft via a drive motor 174 (FIG. 15) and impacting the shot 162 contained in the flapper 160 against the surface of the airfoil, the surface is strengthened. It will be appreciated that the motor and drive shaft are mounted on the third module for movement therewith. For example, the flapper 160 is mounted for pivotal movement on the end of a tool 170 illustrated in FIG. 15 and which tool 170 includes a housing 172 for mounting on the third module 50. The housing includes an air motor 174 driving a shaft 176 geared to a right angularly-rotatable shaft 178. Shaft 178 drives a further shaft 164 which mounts the flapper 160. Additionally, a gearbox 184 envelops the geared connection between shaft 178 and shaft 164 and is adjustable about the axis of shaft 178 by a geared connection 186 with a driving motor 188 through an elongated shaft 190. Thus, the flapper 160 containing shot 162 and mounted on shaft 164 rotates about the axis of shaft 164, as well as about the axis of shaft 178, enabling flapper 160 to shot-peen the refurbished surfaces along the leading edge and adjacent the leading edge of the airfoil. By mounting tool 170 on the third module 50 for movement therewith, the entirety of the surface to be peened can be impacted by the flapper containing the steel shot.

Referring now to FIGS. 16 and 17, there is illustrated a fillet abrading tool and guide therefor, generally designated 189. Tool 189 may be mounted on the same housing 172 as in FIG. 15. The fillet abrading tool may comprise a generally cylindrical abrading or grinding tool 197, e.g., a burr, for engaging fillet portions at the juncture of the airfoil and base of the airfoil as illustrated in FIG. 17. Tool 189 also includes a guide 199 comprised of a cylindrical pin extending from the tool 189 in parallel relation to the axis of the abrading or grinding tool 197. The axis of guide 199, however, is laterally offset from the axis of the abrading or grinding tool 197, as illustrated in FIG. 17. The guide pin 199 controls the depth of material removed from the airfoil 12 in the fillet region. For example, the pin 199 and abrading or grinding tool 197 contact the surface of the leading edge of the airfoil above the fillet/root area that has been previously machined using the blending tool of FIG. 4. The guide 199 and abrading or grinding tool 197 are perpendicular to the surface of the airfoil. As the head is moved toward the root, the tool 197 engages the fillet region and begins removal of material. Removal of excessive material by the burr is prevented by engaging the guide 199 along the airfoil. Multiple passes are performed until the same amount of material is removed in the root or fillet area as removed above the fillet/root area and controlled by the guide pin which engages the area previously machined by the blending tool. The tool 189 may be rotated around the leading edge in the fillet region to provide the required radius to the leading edge and remove damaged material on the pressure and suction sides in the fillet area. Multiple abrasive grits by changing burrs 197 and multiple passes may be utilized.

Referring to FIG. 18, there is illustrated a tool head comprising a measuring head 192 which may be in the form of a linear encoder. The measuring head is mounted on the third module 50. By locating the measuring head adjacent various surfaces of the leading edge and adjacent to the leading edge of the selected airfoil, the location of the airfoil can be ascertained in relation to the manipulator 20 and recorded in the control system 120. To accomplish the foregoing, the measuring head 192 includes a pair of right-angularly related pins 194 and 196, as well as a flat plate 198. Thus, pin 194 extends axially, pin 196 extends radially and the flat surface 198 faces in the axial direction of the compressor. Each pin 194 and 196 and the flat plate 198 includes a discrete electrical connection to the motion controller 122, which in turn includes an electrical connection between the compressor airfoils. When any pin 194 or 196 or face 198 contacts the blade, an electrical circuit is completed. Thus, the motion control knows where the airfoil is located relative to the manipulator 20. For example, if the measuring head 192 is moved circumferentially, pin 194 touches the airfoil and completes the electrical circuit identifying the circumferential location of the airfoil. After backing the measuring head off, the measuring head is moved in a generally radially inward direction to contact pin 196 against the airfoil platform 201. Upon contact, electrical connection is completed and the radial distance from the centerline to the surface of the platform 201 is measured and recorded. After backing the measuring head off, the measuring head is advanced toward the blade to provide contact between plate 198 and the blade, completing the electrical connection. Thus, the location of the blade along the rotor axis is measured and recorded. As indicated previously, these measurements may be utilized to provide preprogrammed movement of the various heads for repair of the airfoils. Also, the measuring head may be used to determine the magnitude of the material removed by the blending tool.

Figure 19:
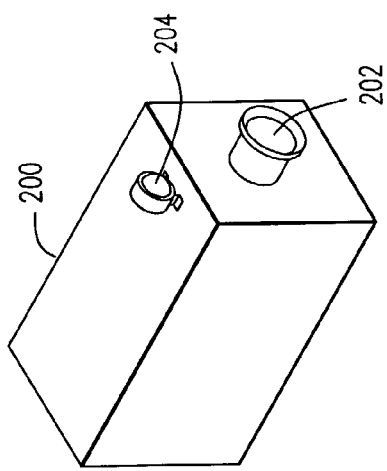
FIG. 19 is a schematic illustration of a camera and light for mounting on the third module.

Illustrated in FIG. 19 is a tool head 200 mounting combined camera 202 and light 204. The combined camera and light is mounted on the third module 50 and can be used to inspect the surfaces of the airfoil being repaired. For example, the leading edge surface can be viewed remotely to ensure that sufficient material has been removed and that the surface is prepared for shot-peening. The tool head 200 mounting the camera and light may also be used to inspect the finished airfoil surface subsequent to shot-peening. It will be appreciated that a hand-held camera and/or light may be used.

To utilize the repair apparatus hereof, the track is mounted to the inlet portion 11 of the compressor. Any suitable clamping devices may be used to mount the track to the inlet portion. The manipulator 20 is mounted on the track. The tool head containing the measuring head 192 is then secured to the third module. By driving the servo-motors 36, 44, 54, the measuring head 192 is inserted past the fixed entrance vanes adjacent the compressor inlet and into engagement with a selected airfoil undergoing repair. By engaging the measuring head against the airfoil surface, e.g., about the leading edge, the location of the leading edge of the selected airfoil relative to the manipulator becomes known and is stored in the control system. Next, the measuring head is removed from a third module and the abrasive or blending tool 70 is applied to the third module. The abrasive tool is then inserted into the compressor inlet. By comparison with the measured location of the surfaces of the airfoil undergoing repair, the tip of the blending tool 70 can be brought into engagement with the selected airfoil along the entirety of the surface undergoing repair. That is, by actuating the servo-motors, the abrading tool can be applied along the leading edge from the root to the tip of the airfoil using the previously measured locations. Alternatively, a preprogrammed abrasive pattern can be applied to the leading edge once initial and ending locations along the edge are ascertained. The finger 74 mounting the blending tool is motor-driven into a predetermined position and subsequently engaged against the airfoil to deflect the finger and tool against the bias of spring 95. Thus, the blending tool carried by the finger 74 is biased into engagement with the airfoil under a substantially constant force as the blending tool is displaced along the airfoil.

After the blending tool has abraded sufficient material from the airfoil, the abrading tool is replaced by the fillet area tool whereby a predetermined amount of material in the fillet area of the blade is also removed. After sufficient material has been removed, the camera and light tool 200 is utilized whereby the abraded surface can be inspected. The airfoil surface can be once again abraded as needed or abraded in spots as needed subsequent to the inspection. Once the required amount of material has been removed from the airfoil surface, the surface can be shot-peened using either one of the free shot or the flapper shot peening processes. By knowing the location of the selected airfoil surface, the free shot and flapper peening devices can be brought into an appropriate location relative to the surface to effect surface strengthening by shot-peening. After shot-peening, a final inspection can be made by using the light and camera head.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for in situ repair of airfoils of a compressor, comprising:
    a manipulator for mounting to an inlet of the compressor and for movement in a generally circumferential direction about an axis;
    a tool carried by said manipulator for movement therewith and relative thereto about three orthogonally related axes, said tool being movable into the inlet of the compressor to a position in contact with a selected airfoil;
    a drive system for driving said tool into contact with the selected airfoil; and
    a system for controlling the drive system to position the tool in contact with the selected airfoil for repairing the selected airfoil;
    said drive system including a servo-motor coupled to a lead screw for driving said tool into contact with the selected airfoil.

2. Apparatus according to claim 1 including a system for measuring and recording the position of the tool relative to the selected airfoil, said control system being responsive to the measuring and recording system to position the tool in contact with the selected airfoil.

3. Apparatus according to claim 1 wherein said tool includes an abrasive carried by said manipulator for movement into contact with the selected airfoil.

4. Apparatus according to claim 3 wherein said abrasive is carried by a finger pivotally carried by said manipulator.

5. Apparatus for in situ repair of airfoils of a compressor, comprising:
    a manipulator for mounting to an inlet of the compressor and for movement in a generally circumferential direction about an axis;
    a tool carried by said manipulator for movement therewith and relative thereto about three orthogonally related axes, said tool being movable into the inlet of the compressor to a position in contact with a selected airfoil;
    a drive system for driving said tool into contact with the selected airfoil; and
    a system for controlling the drive system to position the tool in contact with the selected airfoil for repairing the selected airfoil;
    said tool including a section carrying an abrasive and pivotally carried by said manipulator, and a spring for biasing said section to maintain the abrasive engaged against the airfoil with a substantial constant force.

6. Apparatus according to claim 5 wherein said tool includes an endless abrasive belt and a drive motor for driving the belt.

7. Apparatus according to claim 6 wherein said tool includes a fixed section, said pivoted section being pivoted to said fixed section, said abrasive belt being carried by said fixed section and said pivoted section with the pivoted section being pivoted about an axis intermediate a longitudinal extent of the belt.

8. Apparatus according to claim 7 including a motor carried by said fixed section for rotating the pivoted section about the intermediate axis.

9. Apparatus according to claim 7 wherein said fixed section includes a drive wheel engaging said belt, said pivoted section including a pair of idler wheels spaced from one another, one of said idler wheels being carried by said pivoted section adjacent an end thereof remote from said fixed section and a second idler wheel adjacent an opposite end of said pivoted section in coincidence with said pivot axis.

10. Apparatus for in situ repair of airfoils of a compressor, comprising:
a manipulator for mounting to an inlet of the compressor and for movement in a generally circumferential direction about an axis;
a tool carried by said manipulator for movement therewith and relative thereto about three orthogonally related axes, said tool being movable into the inlet of the compressor to a position in contact with a selected airfoil;
a drive system for driving said tool into contact with the selected airfoil; and
a system for controlling the drive system to position the tool in contact with the selected airfoil for repairing the selected airfoil;
said tool including a device for shot peening the surface of the selected airfoil.

11. Apparatus according to claim 10 wherein said shot peening device includes a flapper carrying shot within a flexible matrix and a drive carried by said manipulator for rotating the flapper about an axis to shot peen the surface of the selected airfoil.

12. Apparatus according to claim 10 wherein said shot peening device includes a gun barrel for propelling free steel shot for impact against the surface of the selected airfoil to strengthen the surface.

13. Apparatus according to claim 12 wherein the gun barrel includes a nozzle through which the steel shot passes for impact against the airfoil surface and an enclosure about the nozzle and at least a portion of the airfoil for collecting the steel shot after impact on the airfoil surface.

14. Apparatus according to claim 13 including a vacuum system coupled to said enclosure for removing the steel shot from the enclosure.

15. Apparatus according to claim 12 wherein the gun barrel includes a nozzle through which the steel shot passes for impact against the airfoil surface, said nozzle carrying a deflector for deflecting steel shot passing through the nozzle onto a surface of the airfoil.

16. Apparatus according to claim 10 wherein said tool includes a grinding tool and a guide for engagement with the airfoil to enable the grinding tool to remove material from the blade to only a limited depth.

17. Apparatus for in situ repair of airfoils of a compressor, comprising:
an arcuate track for mounting to an inlet of the compressor;
a manipulator mounted on said track for movement in a generally circumferential direction about an axis and along said track;
a support system for a tool including a first module carried by said manipulator for movement therewith and relative thereto in a generally tangential direction;
a second module carried by said first module for movement relative to said first module in a direction normal to said tangential direction and generally in a plane normal to an axis of the compressor;
a third module carried by said second module for movement relative to said second module in a direction generally parallel to said axis, said tool being carried by said third module for movement therewith;
a drive system for driving said modules in the respective directions;
a system for measuring and recording the position of the tool relative to a selected airfoil; and
a system responsive to the measuring and recording system for controlling the drive system to position the tool relative to the selected airfoil for repairing the selected airfoil.

18. Apparatus according to claim 17 wherein the drive system includes a servo-motor coupled to a lead screw for driving at least one of said modules.

19. Apparatus according to claim 17 wherein the drive system includes a servo-motor and a lead screw for driving each of the respective modules.

20. Apparatus according to claim 17 wherein said tool includes an abrasive carried by said third module for movement relative to said third module.

21. Apparatus according to claim 17 wherein said tool includes a finger carrying an abrasive and pivotally carried by said third module.

22. Apparatus according to claim 21 wherein said finger is pivotally carried for movement by said third module about an axis extending generally parallel to the direction of movement of said second module relative to said first module.

23. Apparatus according to claim 17 wherein said tool includes a section carrying an abrasive and pivotally carried by said third module, and a spring for biasing said abrasive to maintain the abrasive engaged against the airfoil with a substantial constant force.

24. Apparatus according to claim 17 wherein said tool includes an endless abrasive belt and a drive motor for driving the belt.

25. Apparatus according to claim 24 wherein said tool includes a fixed section and a second section pivoted to said fixed section, said abrasive belt being carried by said fixed section and said pivoted section with the pivoted section being pivoted about an axis intermediate a longitudinal extent of the belt.

26. Apparatus according to claim 25 including a motor carried by said fixed section for rotating the pivoted section about the intermediate axis.

27. Apparatus according to claim 25 wherein said fixed section includes a drive wheel engaging said belt, said pivoted section including a pair of idler wheels spaced from one another, one of said idler wheels being carried by said pivotal section adjacent an end thereof remote from said fixed section and a second idler wheel adjacent an opposite end of said pivoted section in coincidence with said pivot axis.

28. Apparatus according to claim 17 wherein said tool includes a device for shot peening the surface of the selected airfoil.

29. Apparatus according to claim 28 wherein said shot peening device includes a flapper carrying captive shot within a flexible matrix and a drive carried by said module for rotating the flapper about an axis to shot peen the surface of the selected airfoil.

30. Apparatus according to claim 28 wherein said shot peening device includes a gun barrel for propelling free steel shot for impact against the surface of the selected airfoil to strengthen the surface.

31. Apparatus according to claim 30 wherein the gun barrel includes a nozzle through which the steel shot passes for impact against the airfoil surface and an enclosure about the nozzle and at least a portion of the airfoil for collecting the steel shot after impact on the airfoil surface.

32. Apparatus according to claim 31 including a vacuum system coupled to said enclosure for removing the steel shot from the enclosure.

33. Apparatus according to claim 30 wherein the gun barrel includes a nozzle through which the steel shot passes for impact against the airfoil surface, said nozzle carrying a deflector for deflecting steel shot passing through the nozzle onto a surface of the airfoil.

* * * * *